(12) United States Patent
Zhang

(10) Patent No.: US 11,475,803 B2
(45) Date of Patent: Oct. 18, 2022

(54) FLEXIBLE DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Zhuo Zhang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 216 days.

(21) Appl. No.: 16/613,780

(22) PCT Filed: Sep. 19, 2019

(86) PCT No.: PCT/CN2019/106674
§ 371 (c)(1),
(2) Date: Nov. 14, 2019

(87) PCT Pub. No.: WO2020/237920
PCT Pub. Date: Dec. 3, 2020

(65) Prior Publication Data
US 2021/0335153 A1    Oct. 28, 2021

(30) Foreign Application Priority Data
May 27, 2019   (CN) .......................... 201910447307.9

(51) Int. Cl.
*G09F 9/30* (2006.01)
*G06F 1/16* (2006.01)

(52) U.S. Cl.
CPC ............ *G09F 9/301* (2013.01); *G06F 1/1652* (2013.01)

(58) Field of Classification Search
CPC .......... G09F 9/30; G09F 9/301; G06F 1/1652; G09G 3/3266; G09G 3/3275; G02F 1/13452; H01L 27/124; H01L 27/3276; H05K 7/1427; H05K 2201/10128
See application file for complete search history.

(56) References Cited

U.S. PATENT DOCUMENTS

| | | | | |
|---|---|---|---|---|
| 6,498,597 | B1 * | 12/2002 | Sawano ................. | G09F 11/29 345/107 |
| 10,466,748 | B2 * | 11/2019 | Choi ..................... | H01L 51/525 |
| 10,617,017 | B2 * | 4/2020 | Park ..................... | H05K 5/0217 |
| 10,789,863 | B2 * | 9/2020 | Song ..................... | H05K 1/189 |
| 10,878,728 | B2 * | 12/2020 | Yoon ..................... | G06F 1/1681 |

(Continued)

FOREIGN PATENT DOCUMENTS

CN        105590554 a     5/2016
CN        205264268 U  *  5/2016
(Continued)

*Primary Examiner* — Joe H Cheng

(57) ABSTRACT

A flexible display device includes a flexible display screen and a plurality of first reels. The flexible display screen comprises a plurality of groups of flexible film layers corresponding to the plurality of first reels. One terminal of groups of flexible film layers connected to the corresponding first reel. Each of the groups of flexible film layers is curled on the corresponding first reel when the flexible film layer is curled.

11 Claims, 2 Drawing Sheets

(56) References Cited

U.S. PATENT DOCUMENTS

| | | | |
|---|---|---|---|
| 2008/0049003 A1* | 2/2008 | Hasegawa | G06F 1/1683 |
| | | | 345/206 |
| 2015/0029229 A1* | 1/2015 | Voutsas | G09G 3/035 |
| | | | 345/661 |
| 2015/0340004 A1* | 11/2015 | Pang | G06F 1/1652 |
| | | | 345/205 |
| 2016/0135284 A1* | 5/2016 | Choi | G09F 9/301 |
| | | | 361/749 |
| 2016/0155965 A1* | 6/2016 | Kusuura | H01L 51/0024 |
| | | | 361/749 |
| 2016/0161983 A1* | 6/2016 | Lee | G06F 1/1652 |
| | | | 361/749 |
| 2016/0187929 A1 | 6/2016 | Kim et al. | |
| 2017/0013726 A1* | 1/2017 | Han | H05K 5/03 |
| 2017/0031387 A1* | 2/2017 | Kim | G06F 1/1652 |
| 2017/0103735 A1* | 4/2017 | Oh | G06F 1/1601 |
| 2017/9325343 | 11/2017 | Seo et al. | |
| 2017/0358636 A1* | 12/2017 | Kim | G02F 1/133305 |
| 2018/0110137 A1 | 4/2018 | Kim et al. | |
| 2618/0359869 | 12/2018 | Kim et al. | |
| 2020/0214149 A1* | 7/2020 | Lee | H05K 5/0017 |

FOREIGN PATENT DOCUMENTS

| | | |
|---|---|---|
| CN | 205264268 U | 5/2016 |
| CN | 105741683 A | 7/2016 |
| CN | 206039368 U | 3/2017 |
| CN | 206564106 U | 10/2017 |
| CN | 107957807 A | 4/2018 |
| CN | 208061588 U | 11/2018 |
| CN | 109087585 A | 12/2018 |

* cited by examiner

FLEXIBLE DISPLAY DEVICE

This application is the National Stage of PCT/CN2019106674 filed on Sep. 19, 2019, which claims priority under 35 U.S.C. § 119 of Chinese Application No. 201910447307.9 filed on May 27, 2019, the disclosure of which is incorporated by reference.

BACKGROUND

1. Field of the Disclosure

The present disclosure relates to the field of display panel technology, and more particularly, to a flexible display device.

2. Description of the Related Art

With the development of flexible display technology, an organic light-emitting diode (OLED) shows a huge potential in flexible display. From a fixed flexible display screen to a foldable flexible display screen, a display screen has merits of large size and portability. To well save or carry a display screen which is not used better, a curlable flexible display attracts more attention of the market.

However, a polarizer, a touch screen, and a protective film layer are necessarily arranged in the OLED display screen so the thickness of the display screen is thicker. The length of each of the film layers curled is different, and the film layers are firmly connected through an adhesive, which causes the stress accumulated in all of the film layers in the curling process, and peeling, waviness, or cracking to appear on the film layers due to the problem, it is very hard to make a curlable display come true.

SUMMARY

A flexible display device is proposed by the embodiment of the disclosure to deal with the problem that peeling, waviness, or cracking occurs when a display screen of the related art is curled.

A flexible display device includes a flexible display screen and a plurality of first reels. The flexible display screen includes a plurality of groups of flexible film layers corresponding to the plurality of first reels.

One terminal of groups of flexible film layers connected to the corresponding first reel. Each of the groups of flexible film layers being curled on the corresponding first reel when the flexible film layer is curled.

Furthermore, the flexible display device comprises a plurality of second reels corresponding to the plurality of flexible film layers respectively;

one terminal of each of the groups of flexible film layers away from the first reel is connected to the corresponding second reel; when the flexible display screen is curled, both terminals of each of the groups of flexible film layers are curled at the corresponding first reel and the corresponding second reel, respectively.

Furthermore, the thickness of each of the groups of the flexible film layers is the same.

Furthermore, the flexible film layer comprises a back-plate protective layer, a display panel, a polarizer, a touch screen, and a protective film layer. The display panel and the polarizer are sequentially attached on the back-plate protective layer to form a group of flexible film layer collectively. The protective film layer is attached on the touch screen to form a group of flexible film layer collectively.

Furthermore, the flexible display screen comprises a back-plate protective layer, a display panel, a polarizer, a touch screen, and a protective film layer. The display panel and the polarizer are sequentially attached on the back-plate protective layer to form a group of flexible film layer collectively. The touch film forms a group of flexible film layer; the protective film layer forms a group of flexible film layer.

Furthermore, the flexible display device further comprises a first outer casing; the first reel is arranged in the first outer casing. A first opening which matches with the flexible display screen is arranged on the first outer casing so the flexible display is curled in the first outer casing through the first opening.

Furthermore, the flexible display device further comprises a hand-held portion; each of the groups of flexible film layers, which is away from the first reel, is connected to the hand-held portion. An orthographic projection of the hand-held portion on the first outer casing is greater than an orthographic projection of the first opening on the first outer casing so when the flexible display screen is curled, the hand-held portion is arranged outside the first outer casing.

Furthermore, a fixing portion is arranged in the first outer casing; the flexible display is locked to keep the flexible display screen stretched. The flexible display screen is unlocked to keep the flexible display screen curled in the first outer casing.

Furthermore, a control button is further disposed on the first outer casing. The control button is connected to the fixing portion so the flexible display screen is locked or unlocked with the fixing portion.

Furthermore, the flexible display device further comprises a first outer casing and a second outer casing; the first reel is arranged in the first outer casing; the second reel is arranged in the second outer casing. A first opening which matches the flexible display screen is arranged on the first outer casing. A second opening which matches the flexible display screen is arranged on the second outer casing. When the flexible display is curled, the first outer casing contacts the second outer casing. Both terminals of the flexible display screen are curled in the first outer casing and the second outer casing through the first opening and the second opening, respectively.

Furthermore, a fixing portion is arranged in the first outer casing. A fixing portion is arranged in the second outer casing. The flexible display screen is firmly locked with the fixing portions when the flexible display screen is stretched so the flexible display screen keeps stretched. When being curled, the flexible display screen is unlocked so the terminals of the flexible display screen are curled in the first outer casing and the second outer casing, respectively.

Furthermore, a control button is disposed on each of the first outer casing. A control button is disposed on the second outer casing; the control button is connected to the corresponding fixing portion to control the corresponding fixing portion to lock or unlock the flexible display screen.

The flexible display includes a plurality of flexible film layers. Each of the groups of flexible film layers corresponds to one of the first reels. When the flexible display is curled, each of the groups of flexible film layers are curled on the corresponding first reel independently, which prevents all of the film layers from being curled on the same reel, thereby reducing the thickness of the film layer of each of the reels and the stress of the film layer of each of the reels. Accordingly, the film layer will not endure peeling, waviness, or cracking when the flexible display is curled; instead, the flexible display can be effectively and well curled.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE EMBODIMENTS

Figure 1:
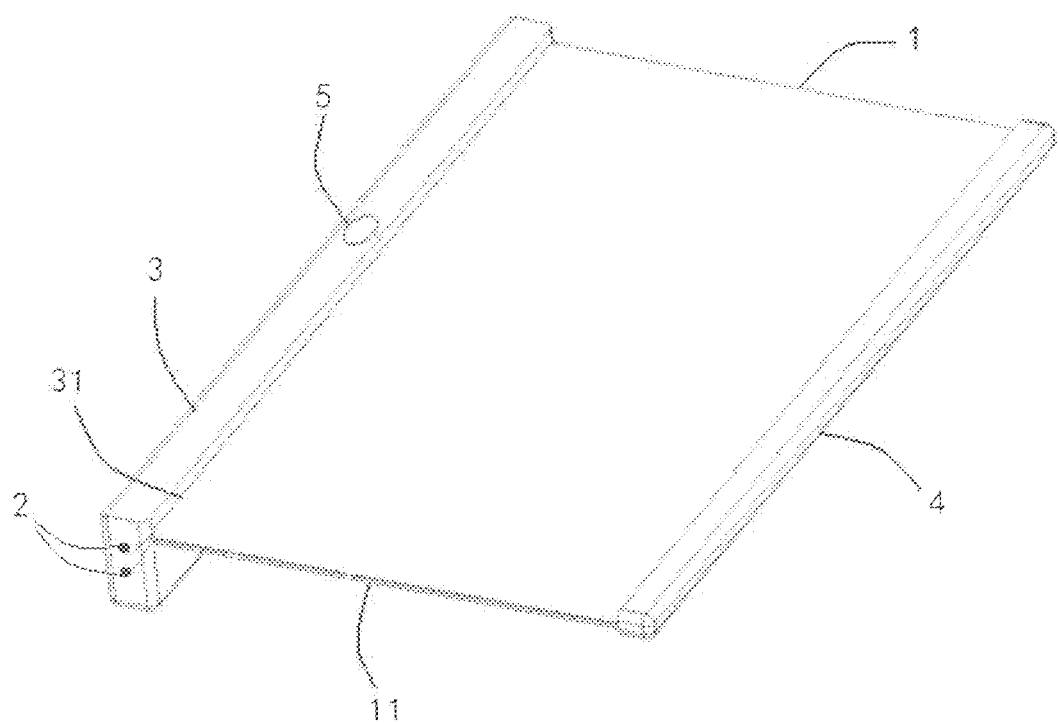
FIG. 1 illustrates a flexible display device being stretched according to an embodiment of the present disclosure.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to one or more embodiments of the inventive concept.

FIG. 1 is a schematic diagram of the structure of a flexible display device according to a first embodiment of the present disclosure.

The flexible display device includes a flexible display screen 1 and a plurality of first reels 2. The flexible display screen 1 includes a plurality of groups of flexible film layers 11. Each of the plurality of groups of flexible film layers 11 corresponds to each of the plurality of first reels 2. The flexible film layers in the flexible display screen 1 can be divided into two, three, or more groups. The thickness of each group of flexible film layers is as similar as possible. The plurality of groups of flexible film layers 11 are independent of each other, i.e., are not bonded together with an adhesive.

Figure 2:
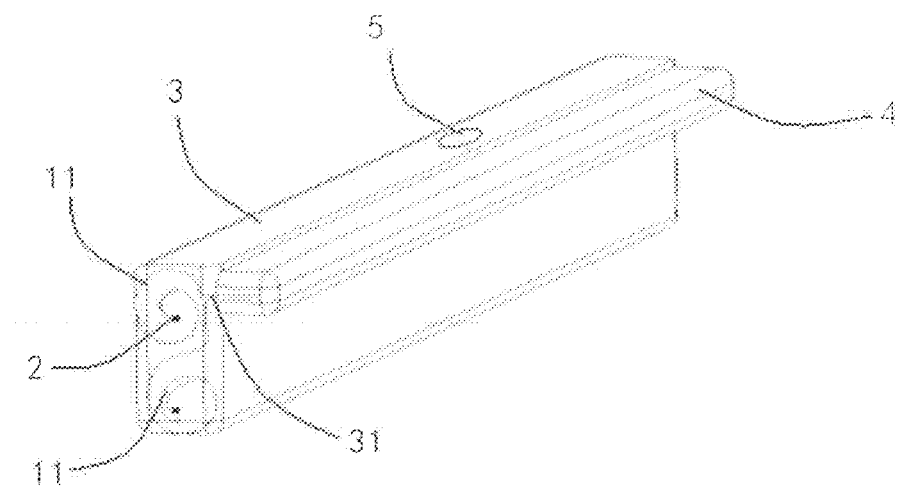
FIG. 2 illustrates a flexible display device being curled according to an embodiment of the present disclosure.

One terminal of each of the groups of flexible film layers 11 is connected to the corresponding first reel 2. When the flexible display screen 1 is curled, each of the first reels 2 rotates and then activates the corresponding flexible film layer to curl. When the flexible display screen 1 is curled, each of the groups of the flexible film layers 11 are curled on the corresponding first reel 2, as illustrated in FIG. 2. When the flexible display screen 1 is stretched, each of the first reels 2 rotates and then activates the corresponding flexible film layer to stretch. When the flexible display screen 1 is stretched, all of the flexible film layers 11 are overlapped to form the flexible display screen 1 collectively. The first reel rotates clockwise or counterclockwise. The first reel can rotate in the same direction or different directions, which is not limited.

In the first embodiment, the flexible film layer 11 in the flexible display screen 1 is divided into a plurality of groups and curled independently to reduce the thickness of the curled film layers 11, thereby reducing the stress of each of the film layers. Accordingly, the film layer will not endure peeling, waviness, or cracking when the flexible display is curled; instead, the flexible display can be effectively and well curled.

The plurality of first reels 2 are arranged in parallel. When the flexible display screen 1 is stretched, the plurality of first reels 2 are arranged on the flexible display screen 1 at the same side. The length of each of the first reels 2 is the same as the width of the corresponding group of the flexible films 11. The width of the corresponding group of the flexible films 11 is the length of one side of each of the groups of the flexible film 11 which is connected to the first reels 2. When the flexible display screen 1 is curled, all of the flexible films 11 are curled at the same side.

The flexible display device further includes a first outer casing 3. The first reel 2 is arranged in the first outer casing 3. A first opening 31 which matches with the flexible display screen 1 is arranged on the first outer casing 3. In this way, the flexible display screen 1 is curled in the first outer casing 3 through the first opening 31.

The first outer casing 3 may be shaped as a cuboid. A plurality of first reels 2 are juxtaposed in the first outer casing 3. The first opening 31 is disposed at one side of the first outer casing 3 which is in parallel with the plane where the plurality of first reels 2 are placed. The shape and size of the first opening 31 match the shape and size of the longitudinal section of the flexible display screen 1; that is, the flexible display screen 1 can penetrate the first opening 31. As illustrated in FIG. 1, one terminal of each of the groups of flexible film layers 11 is firmly fixed to the corresponding first reel 2. When the flexible display screen 1 is stretched, the other terminal of each of the groups of flexible film layers 11 penetrates the first opening 31 and the flexible display screen 1 is stretched. So the flexible display screen 1 is stretched outside the first outer casing 3. The flexible display screen 1 is curled on the corresponding first reel 2 in the first outer casing 3 through the first opening 31.

The flexible display device further includes a hand-held portion 4. Each of the groups of flexible film layers 11, which is away from the first reel 2, is connected to the hand-held portion 4. The orthographic projection of the hand-held portion 4 on the first outer casing 3 is greater than the orthographic projection of the first opening 31 on the first outer casing 3. When the flexible display screen 1 is curled, the hand-held portion 4 is arranged outside the first outer casing 3, as illustrated in the FIG. 2.

When the flexible display screen 1 is unfolded, the first reel 2 and the hand-held portion 4 are arranged on opposite sides of the flexible display screen 1. Each of the groups of flexible film layers 11 are connected to the hand-held portion 4 to activate all flexible film layers 11 to curl or unfold through the hand-held portion 4. The hand-held portion 4 is shaped like a strip. The length of the hand-held portion 4 is the same as the width of the flexible display screen 1. The width of the flexible display screen 1 is the length of one side of the flexible display screen 1, which is connected to the hand-held portion. The cross-sectional area of the hand-held portion 4 in the direction parallel to the first opening 31 is greater than the area of the first opening 31. When the flexible display screen 1 is curled, each of the groups of flexible film layers 11 is curled through the first opening 31 on the corresponding first reel 2 in the first outer casing 3. The hand-held portion 4 does not penetrate the first opening 31 and arranged outside the outer casing 3. The user stretches the flexible display screen 1 through the hand-held portion 4, as illustrated in FIG. 2.

A fixing portion (not illustrated) is arranged in the first outer casing 3. The flexible display screen 1 is locked to keep the flexible display screen 1 stretched. The flexible display screen 1 is unlocked to keep the flexible display screen 1 curled in the first outer casing 3.

The flexible film layers 11 are not bonded with an adhesive. When the flexible display screen 1 is stretched, the different groups of flexible film layers 11 are relatively fixed with the fixing portions to maintain unfolded, which forms the flexible display collectively. When the flexible display screen 1 is curled, the fixing portion loosens the fixing of the respective groups of flexible film layers 11 so that the respective groups of flexible film layers 11 are curled on the corresponding first reels 2.

A control button 5 is further disposed on the first outer casing 3. The control button 5 is connected to the fixing portion. So the flexible display screen 1 is locked or unlocked with the fixing portion.

The control button 5 is disposed outside the first outer casing 3. To stretch the flexible display screen 1 through the hand-held portion 4 to unfold the flexible display screen 1, the user presses the control button 5 and controls the fixing portion to lock the flexible display screen 1 to keep the flexible display screen 1 unfolded. When the flexible display screen 1 needs to be curled, the user presses the control button 5 to control the fixing portion to unlock the flexible display screen 1 so the flexible display screen 1 is curled in the first outer casing 3.

Figure 3:
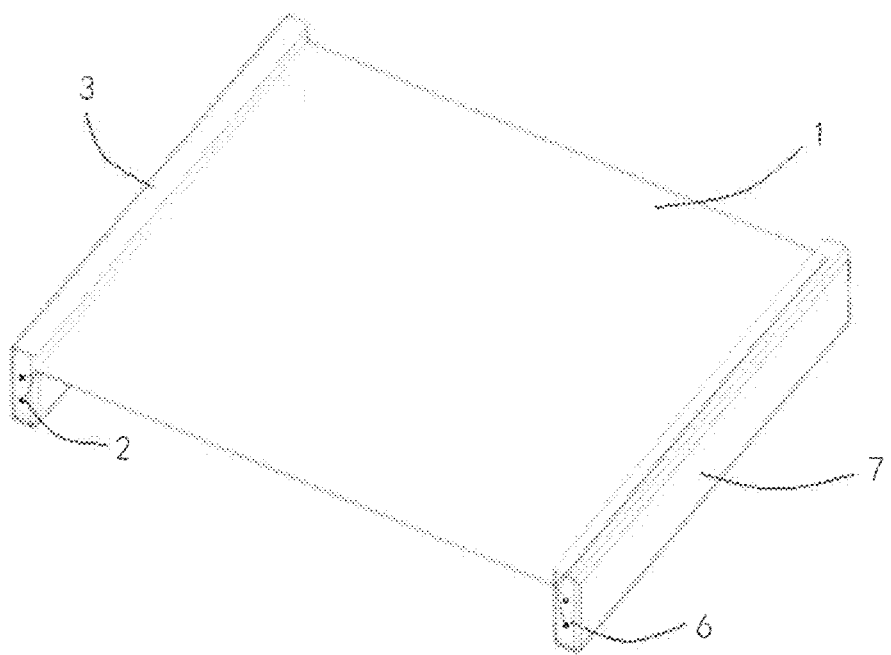
FIG. 3 illustrates a flexible display device being stretched according to another embodiment of the present disclosure.
Figure 4:
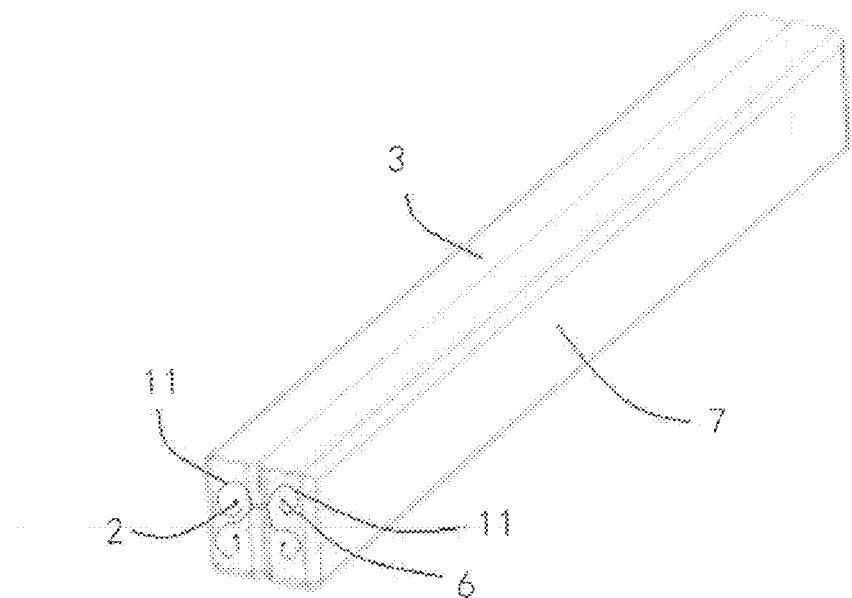
FIG. 4 illustrates a flexible display device being curled according to another embodiment of the present disclosure.

As illustrated in FIG. 3, a flexible display device further includes a second reel 6 corresponding to a plurality of groups of flexible film layers 11 respectively in another embodiment. One terminal of each group of flexible film layers 11 away from the first reel 2 is connected to a corresponding second reel 6. When the flexible display screen 1 is curled, both terminals of each group of flexible film layers 11 are curled at the corresponding first reel 2 and the corresponding second reel 6, respectively, as illustrated in FIG. 4.

A plurality of first reels 2 are arranged in parallel in a column. A plurality of second reels 6 are arranged in parallel in a column. The length of each of the plurality of first reels 2 is the same as the width of one of the corresponding groups of flexible film layers 11. The length of each of second reels 6 is the same as the width of one of the corresponding groups of the flexible film layer 11. When the flexible display screen 1 is stretched, the first reel 2 and the second reel 6 are arranged at both terminals of the flexible display screen 1, respectively, and connected to the terminals of the flexible display screen 1, respectively. When the flexible display screen 1 is curled, the first reel 2 and the second reel 6 rotates simultaneously, which activates both terminals of each of the groups of flexible film layers 11 to curl simultaneously.

The flexible display device further includes a first outer casing 3 and a second outer casing 7. The first reel 2 is arranged in the first outer casing 3. The second reel 6 is arranged in the second outer casing 7. A first opening (not illustrated) which matches the flexible display screen 1 is arranged on the first outer casing 3. A second opening (not illustrated) which matches the flexible display screen 1 is arranged on the second outer casing 7. When the flexible display is curled, the first outer casing 3 contacts the second outer casing 7. Both terminals of the flexible display screen 1 are curled in the first outer casing 3 and the second outer casing 7 through the first opening and the second opening, respectively.

The first outer casing 3 and the second outer casing 7 may be shaped as a cuboid. A plurality of first reels 2 are juxtaposed in the first outer casing 3. A plurality of second reels 2 are juxtaposed in the second outer casing 7. The first opening is disposed at one side of the first outer casing 3 which is in parallel with the plane where the plurality of first reels 2 are placed. The second opening is disposed at one side of the second outer casing 7 which is in parallel with the plane where the plurality of second reels 6 are placed. The shape and size of the first opening match the shape and size of the longitudinal section of the flexible display screen 1; that is, the flexible display screen 1 can penetrate the first opening. Likewise, the shape and size of the second opening match the shape and size of the longitudinal section of the flexible display screen 1; that is, the flexible display screen 1 can penetrate the second opening.

The two terminals of each of the groups of flexible film layers 11 are firmly connected to the first reel 2 and the second reel 6 through the first opening and the second opening. When the flexible display screen 1 is curled, each of the groups of flexible film layers 11 is divided into two portions. The two portions are curled on the first reel 2 and the second reel 6 though the first opening and the second opening, respectively, so that the first outer casing 3 contacts the second outer casing 7. When a flexible display is stretched, the first outer casing 3 and the second outer casing 7 are separated to activate each of the groups of flexible film layers 11 to stretch towards both sides. So the flexible film layer 11 is stretched between the first outer casing 3 and the second outer casing 7.

A fixing portion 3 is arranged in the first outer casing. A fixing portion 7 is arranged in the second outer casing. The flexible display screen 1 is firmly locked with the fixing portions when the flexible display screen is stretched so the flexible display screen keeps stretched. When being curled, the flexible display screen 1 is unlocked so the flexible display screen 1 is curled in the first outer casing 3 and the second outer casing 7.

Further, a first control button (not illustrated) is arranged on the first outer casing 3 and connected to a fixing portion of the first outer casing 3. Further, a second control button (not illustrated) is arranged on the second outer casing 7 and connected to a fixing portion of the second outer casing 7. The first control button and the second control button are respectively configured to control the corresponding fixing portions to lock or unlock the flexible display screen 1.

The first control button and the second control button are located outside the first outer casing 3 and the second outer casing 7, respectively. The user pulls up the flexible display screen 1 with the first control button and the second control button. When the flexible display screen 1 is stretched, the user presses the first control button and the second control button to control the flexible display screen 1 with the two fixing portions so that the flexible display screen 1 keeps stretched. To curl the flexible display screen 1, if necessary, the user presses the first control button and the second control button to unlock the flexible display screen 1 with the portions so that the flexible display screen 1 can be curled in the first outer casing 3 and the second outer casing 7.

The flexible display screen 1 includes a back-plate protective layer, a display panel, a polarizer, a touch screen, and a protective film layer. The flexible display screen 1 can be divided into two groups of flexible film layers, three groups of flexible film layers, or more groups of flexible film layers so that the total thickness of each group of flexible film layers is as similar as possible.

In another embodiment, a back-plate protective layer, a display panel, and a polarizer form a first group of flexible film layers collectively. The back-plate protective layer, the display panel, and the polarizer are attached together through an optical adhesive. The back-plate protective layer, the display panel, and the polarizer are curled and arranged on a corresponding reel. A touch screen and a protective layer form a second group of flexible films. The touch screen and the protective film are attached firmly and are curled and arranged on a corresponding reel.

A back-plate protective layer, a display panel, and a polarizer form a first group of flexible films in another embodiment. The back-plate protective layer, the display panel, and the polarizer are attached together through an optical adhesive. The back-plate protective layer, the display panel, and the polarizer are curled and arranged on a corresponding reel. A touch screen forms a second group of flexible films and is curled and arranged on a corresponding reel. A protective layer forms a third group of flexible films and is curled and arranged on a corresponding reel independently.

The flexible display includes a plurality of flexible film layers. Each of the groups of flexible film layers corresponds to one of the first reels. When the flexible display is curled, each of the groups of flexible film layers is curled on the corresponding first reel independently, which prevents all of the film layers from being curled on the same reel, thereby reducing the thickness of the film layer of each of the reels and the stress of the film layer of each of the reels. Accordingly, the film layer will not endure peeling, waviness, or cracking when the flexible display is curled; instead, the flexible display can be effectively and well curled.

While the present invention has been described in connection with what is considered the most practical and preferred embodiments, it is understood that this invention is not limited to the disclosed embodiments but is intended to frame various arrangements made without departing from the scope of the broadest interpretation of the appended claims.

What is claimed is:

1. A flexible display device, comprising: a flexible display screen, a plurality of first reels and a plurality of second reels; the flexible display screen comprising a plurality of groups of flexible film layers corresponding to the plurality of first reels and the plurality of the second reels;
    one terminal of each of the groups of flexible film layers connected to a corresponding first reel; one terminal of each of the groups of flexible film layers away from the corresponding first reel is connected to a corresponding second reel; when the flexible display screen is curled, both terminals of each of the groups of flexible film layers are curled at the corresponding first reel and the corresponding second reel, respectively; and
    wherein the first reels rotate clockwise and second reels rotate counterclockwise to stretch the flexible film layers along a first direction, the plurality of first reels are arranged along a second direction, and the first direction is perpendicular to the second direction.

2. The flexible display device according to claim 1, wherein the thickness of each of the groups of the flexible film layers is the same.

3. The flexible display device according to claim 1, wherein the group of flexible film layers comprise a back-plate protective layer, a display panel, a polarizer, a touch screen, and a protective film layer;
    the display panel and the polarizer are sequentially attached on the back-plate protective layer to form a group of flexible film layer collectively; the protective film layer is attached on the touch screen to form a group of flexible film layer collectively.

4. The flexible display device according to claim 1, wherein the flexible display screen comprises a back-plate protective layer, a display panel, a polarizer, a touch screen, and a protective film layer;
    the display panel and the polarizer are sequentially attached on the back-plate protective layer to form a group of flexible film layer collectively; the touch screen forms a group of flexible film layer; the protective film layer forms a group of flexible film layer.

5. The flexible display device according to claim 1, wherein the flexible display device further comprises a first outer casing; the first reel is arranged in the first outer casing;
    a first opening which matches with the flexible display screen is arranged on the first outer casing so the flexible display screen is curled in the first outer casing through the first opening.

6. The flexible display device according to claim 5, wherein the flexible display device further comprises a hand-held portion; each of the groups of flexible film layers, which is away from the first reel, is connected to the hand-held portion;
    an orthographic projection of the hand-held portion on the first outer casing is greater than an orthographic projection of the first opening on the first outer casing so when the flexible display screen is curled, the hand-held portion is arranged outside the first outer casing.

7. The flexible display device according to claim 5, wherein a fixing portion is arranged in the first outer casing; the flexible display screen is locked to keep the flexible display screen stretched; the flexible display screen is unlocked to keep the flexible display screen curled in the first outer casing.

8. The flexible display device according to claim 7, wherein a control button is further disposed on the first outer casing; the control button is connected to the fixing portion so the flexible display screen is locked or unlocked with the fixing portion.

9. The flexible display device according to claim 1, wherein the flexible display device further comprises a first outer casing and a second outer casing; the first reel is arranged in the first outer casing; the second reel is arranged in the second outer casing;
    a first opening which matches the flexible display screen is arranged on the first outer casing; a second opening which matches the flexible display screen is arranged on the second outer casing; when the flexible display screen is curled, the first outer casing contacts the second outer casing; both terminals of the flexible display screen are curled in the first outer casing and the second outer casing through the first opening and the second opening, respectively.

10. The flexible display device according to claim 9, wherein a fixing portion is arranged in the first outer casing; a fixing portion is arranged in the second outer casing; the flexible display screen is firmly locked with the fixing portions when the flexible display screen is stretched so the flexible display screen keeps stretched; when being curled, the flexible display screen is unlocked so the terminals of the flexible display screen are curled in the first outer casing and the second outer casing, respectively.

11. The flexible display device according to claim 10, wherein a control button is disposed on each of the first outer casing; a control button is disposed on the second outer casing; the control button is connected to the corresponding fixing portion to control the corresponding fixing portion to lock or unlock the flexible display screen.

* * * * *